United States Patent
Kim et al.

(10) Patent No.: US 11,779,180 B2
(45) Date of Patent: Oct. 10, 2023

(54) ROBOT CLEANER FOR CLEANING IN CONSIDERATION OF FLOOR STATE THROUGH ARTIFICIAL INTELLIGENCE AND OPERATING METHOD FOR THE SAME

(71) Applicant: LG ELECTRONICS INC., Seoul (KR)

(72) Inventors: Kokeun Kim, Seoul (KR); Suyeon Kim, Seoul (KR); Kamin Lee, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 16/539,666

(22) Filed: Aug. 13, 2019

(65) Prior Publication Data

US 2019/0365176 A1    Dec. 5, 2019

(30) Foreign Application Priority Data

Jul. 11, 2019    (KR) .......................... 10-2019-0083619

(51) Int. Cl.
*A47L 9/28* (2006.01)
*A47L 9/00* (2006.01)
(Continued)

(52) U.S. Cl.
CPC ............. *A47L 9/2826* (2013.01); *A47L 9/009* (2013.01); *A47L 9/2852* (2013.01);
(Continued)

(58) Field of Classification Search
CPC ...... A47L 9/2826; A47L 9/009; A47L 9/2852; A47L 2201/04; A47L 2201/06;
(Continued)

(56) References Cited

U.S. PATENT DOCUMENTS 8,370,985 B2 *   2/2013   Schnittman ......... A47L 11/4011
                                                    15/52.1
2006/0259194 A1 *  11/2006  Chiu ................... G05D 1/0255
                                                    700/245
(Continued)

FOREIGN PATENT DOCUMENTS

CN    106814732 A *   6/2017   ........... G05D 1/0219
CN    109984678 A *   7/2019
(Continued)

OTHER PUBLICATIONS

Korean Intellectual Property Office Application Serial No. 10-2019-0083619, Office Action dated Nov. 18, 2020, 7 pages.
(Continued)

*Primary Examiner* — Khoi H Tran
*Assistant Examiner* — Nhi Q Bui
(74) *Attorney, Agent, or Firm* — LEE, HONG, DEGERMAN, KANG & WAIMEY PC

(57) ABSTRACT

A robot cleaner for cleaning in consideration of a floor state through artificial intelligence includes a cleaning unit including a suction unit and a mopping unit, a driving unit to drive the robot cleaner, and a processor to obtain a carpet area or a rug area based on cleaning data, and to control the driving unit to change an entrance direction of the robot cleaner when the robot cleaner enters the carpet area or the rug area.

12 Claims, 9 Drawing Sheets

(51) Int. Cl.
*B25J 11/00* (2006.01)
*G05D 1/02* (2020.01)

(52) U.S. Cl.
CPC ........ *B25J 11/0085* (2013.01); *G05D 1/0212* (2013.01); *A47L 2201/04* (2013.01); *A47L 2201/06* (2013.01); *G05D 2201/0203* (2013.01); *G05D 2201/0215* (2013.01)

(58) Field of Classification Search
CPC ............... B25J 11/0085; G05D 1/0212; G05D 2201/0203; G05D 2201/0215
See application file for complete search history.

(56) References Cited

U.S. PATENT DOCUMENTS

| | | | | |
|---|---|---|---|---|
| 2010/0076599 | A1* | 3/2010 | Jacobs | G05D 1/028 901/1 |
| 2012/0125363 | A1* | 5/2012 | Kim | A47L 9/2805 134/6 |
| 2013/0261867 | A1* | 10/2013 | Burnett | G05D 1/0272 701/23 |
| 2015/0265125 | A1* | 9/2015 | Lee | A47L 11/4066 701/26 |
| 2016/0297072 | A1* | 10/2016 | Williams | B25J 9/1666 |
| 2018/0200891 | A1* | 7/2018 | Erickson | G05D 1/0297 |
| 2019/0015985 | A1* | 1/2019 | Kim | B25J 11/0085 |
| 2019/0061157 | A1* | 2/2019 | Suvarna | G05D 1/0044 |
| 2019/0120633 | A1* | 4/2019 | Afrouzi | G06T 7/30 |
| 2019/0223675 | A1* | 7/2019 | Jang | B25J 9/126 |
| 2019/0223678 | A1* | 7/2019 | Park | B25J 11/0085 |
| 2020/0323411 | A1 | 10/2020 | Li et al. | |

FOREIGN PATENT DOCUMENTS

| | | |
|---|---|---|
| JP | H0678863 | 3/1994 |
| KR | 20150109598 | 10/2015 |
| KR | 20190000894 | 1/2019 |
| KR | 20190025971 | 3/2019 |

OTHER PUBLICATIONS

Korean Intellectual Property Office Application Serial No. 10-2019-0083619, Notice of Allowance dated Aug. 13, 2021, 6 pages.

* cited by examiner

ROBOT CLEANER FOR CLEANING IN CONSIDERATION OF FLOOR STATE THROUGH ARTIFICIAL INTELLIGENCE AND OPERATING METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0083619, filed on Jul. 11, 2019, the contents of which are hereby incorporated by reference herein in its entirety.

BACKGROUND

The present disclosure relates to a robot cleaner for cleaning in consideration of a floor state through artificial intelligence.

A robot cleaner is an AI apparatus to self-drive in an area to be cleaned without an operation of a user to suction foreign substances, such as dust, from the floor, thereby automatically cleaning.

The robot cleaner sets a cleaning path by recognizing the structure of a space and performs a cleaning operation along the set cleaning path. In addition, the robot cleaner cleans according to a preset schedule or a user command.

However, in the case of a conventional robot cleaner, when a carpet or a rug is spread on the floor, and when the robot cleaner enters the carpet or the rug, the carpet or the rug is pushed by the left wheel or the right wheel of the robot cleaner.

When the carpet or the rug is pushed, the carpet or the rug may not be normally cleaned, and the robot cleaner may deviate from the cleaning path.

SUMMARY

The present disclosure is to provide a robot cleaner capable of smoothly entering a carpet area or a rug area by sensing the carpet area or the rug area.

The present disclosure is to provide a robot cleaner capable of more intensively clean a carpet area or a rug area.

The present disclosure is to provide a robot cleaner to prevent a carpet area or a rug area from being repeatedly cleaned after the cleaning of the carpet area or the rug area is finished.

According to an embodiment of the present disclosure, the robot cleaner may obtain a carpet area or a rug area based on cleaning data and may change an entrance direction of the robot cleaner when the robot cleaner enters the carpet area or the rug area.

According to an embodiment of the present disclosure, the robot cleaner may generate a first virtual wall having an area larger than the carpet area or the rug area, when the robot cleaner enters the carpet area or the rug area.

According to an embodiment of the present disclosure, the robot cleaner may generate a second virtual wall having an area smaller than the carpet area or the rug area when the robot cleaner deviates from the carpet area or the rug area, after removing the first virtual area.

As described above, according to various embodiments of the present disclosure, when the robot cleaner enters the carpet area or the rug area, the carpet area or rug area is not pushed. Accordingly, the carpet area or rug area may be cleaned normally. In addition, the probability of failing to clean a relevant area may be reduced.

According to an embodiment of the present disclosure, the carpet area or rug area may be more intensively cleaned, so the carpet area or rug area may be clearly cleaned.

According to an embodiment of the present disclosure, the carpet area or rug area, which has been already cleaned, is not repeatedly cleaned.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
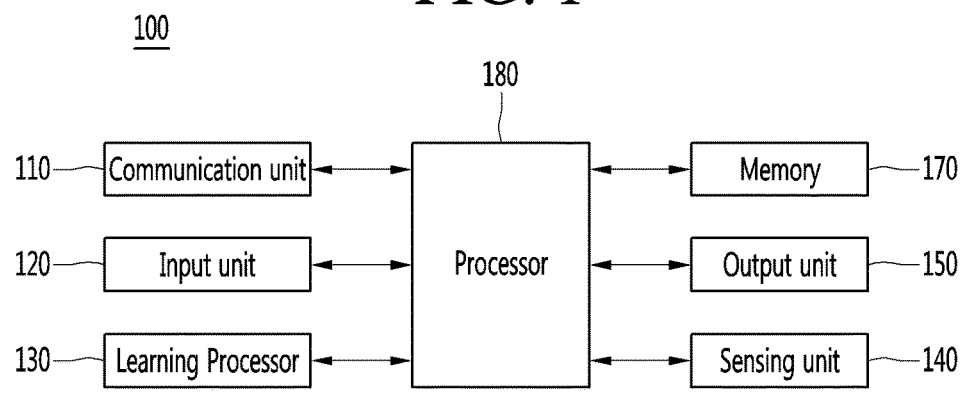
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
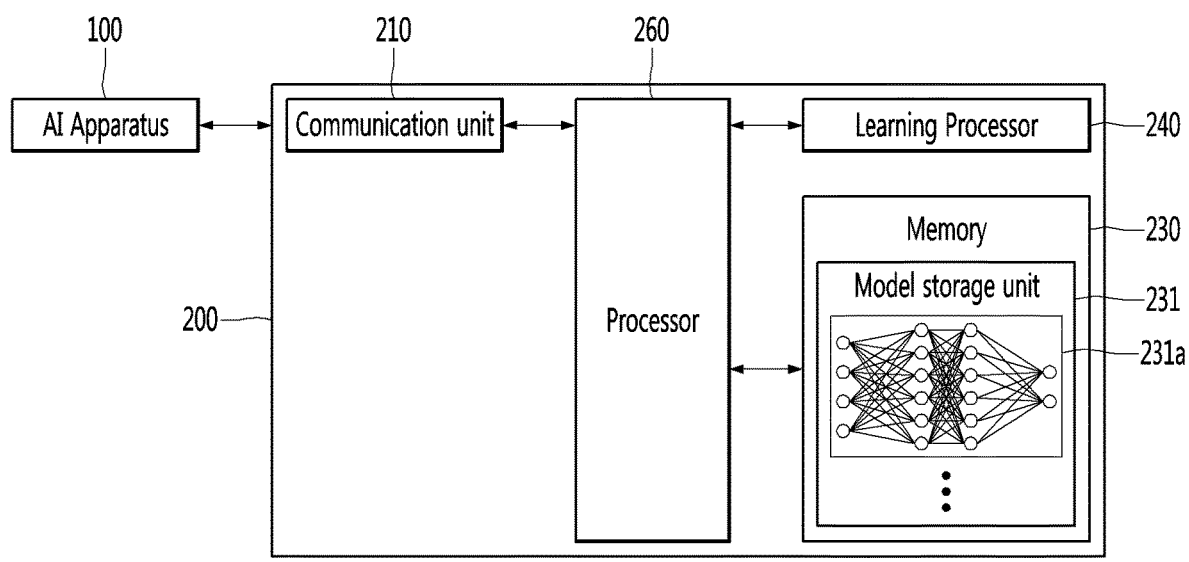
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
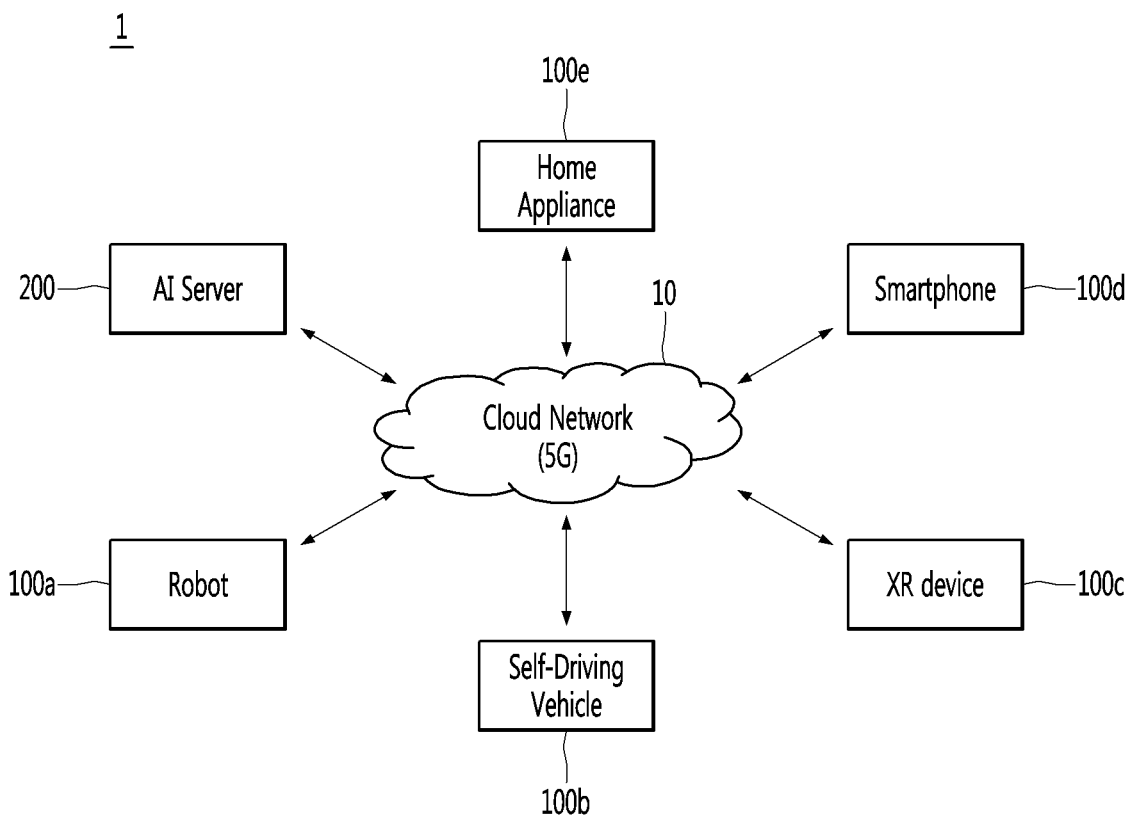
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
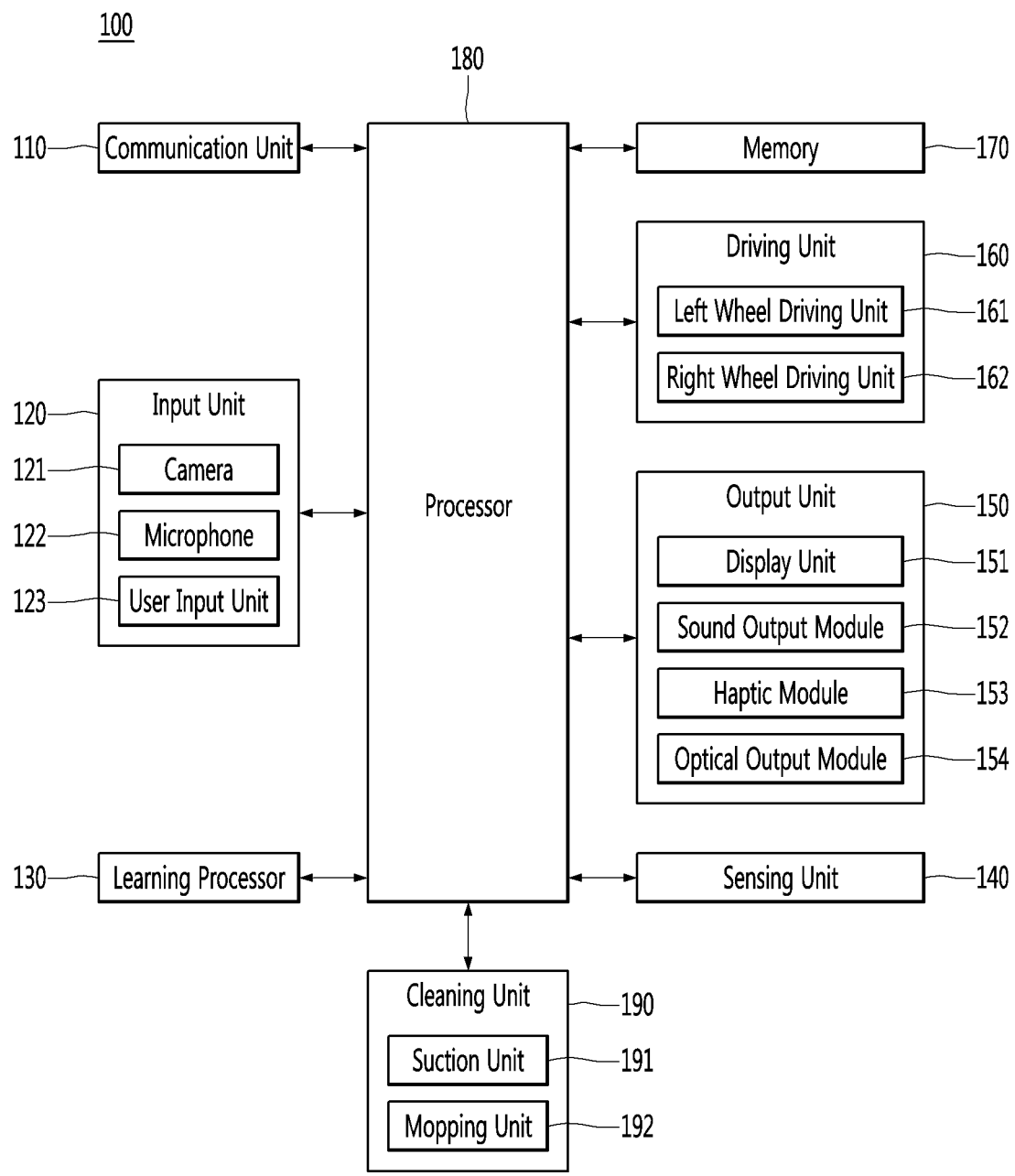
FIG. 4 illustrates an AI device according to an embodiment of the present invention.

FIG. 4 illustrates an AI device 100 according to an embodiment of the present invention.

The redundant repeat of FIG. 1 will be omitted below.

Referring to FIG. 4, the AI device 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The sensing unit 140 may be called a sensor unit.

The sensing unit 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may obtain information on a color image for an object or a user around the AI robot 100. The information on the color image may be an image obtained by photographing an object. The RGB sensor may be named an RGB camera.

In this case, the camera 121 may refer to the RGB sensor.

The output unit 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The driving unit 160 may move the AI robot 100 in a specific direction or by a certain distance.

The driving unit 160 may include a left wheel driving unit 161 to drive the left wheel of the AI robot 100 and a right wheel driving unit 162 to drive the right wheel.

The left wheel driving unit 161 may include a motor for driving the left wheel, and the right wheel driving unit 162 may include a motor for driving the right wheel.

Although the driving unit 160 includes the left wheel driving unit 161 and the right wheel driving unit 162 by way of example as in FIG. 4, but the present invention is not limited thereto. In other words, according to an embodiment, the driving unit 160 may include only one wheel.

The cleaning unit 190 may include at least one of a suction unit 191 or a mopping unit 192 to clean the floor around the AI device 100.

The suction unit 191 may be referred to as a vacuum cleaning unit.

The suction unit 191 may suction air to suction foreign matters such as dust and garbage around the AI device 100.

In this case, the suction unit 191 may include a brush or the like to collect foreign matters.

The mopping unit 192 may wipe the floor in the state that a mop is at least partially in contact with the bottom surface of the AI device 100.

In this case, the mopping unit 192 may include a mop and a mop driving unit to move the mop In this case, the mopping unit 192 may adjust the distance from the ground surface through the mop driving unit. In other words, the mop driving unit may operate such that the mop makes contact with the ground surface when the mopping is necessary.

Figure 5:
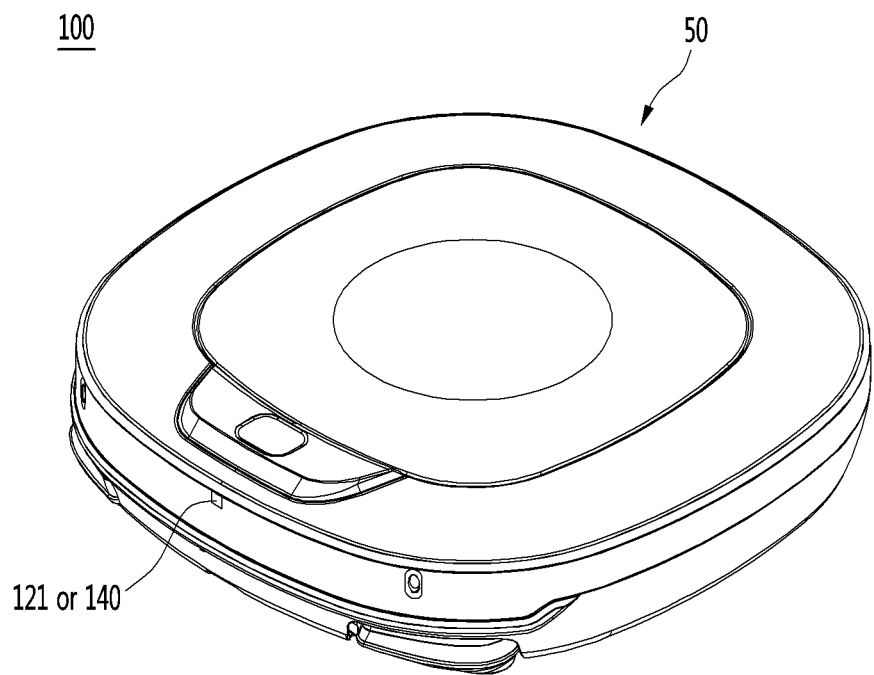
FIG. 5 a perspective view of an AI device according to an embodiment of the present invention.

FIG. 5 a perspective view of the AI device 100 according to an embodiment of the present invention.

Referring to FIG. 5, the AI robot 100 may include a cleaner body 50 and a camera 121 or a sensing unit 140.

The camera 121 or the sensing unit 140 may irradiate a light forward and receive the reflected light.

The camera 121 or the sensing unit 140 may acquire the depth information using the difference between times at which the received lights are returned.

The cleaner body 50 may include remaining components except the camera 121 and the sensing unit 140 described with reference to FIG. 4.

Figure 6:
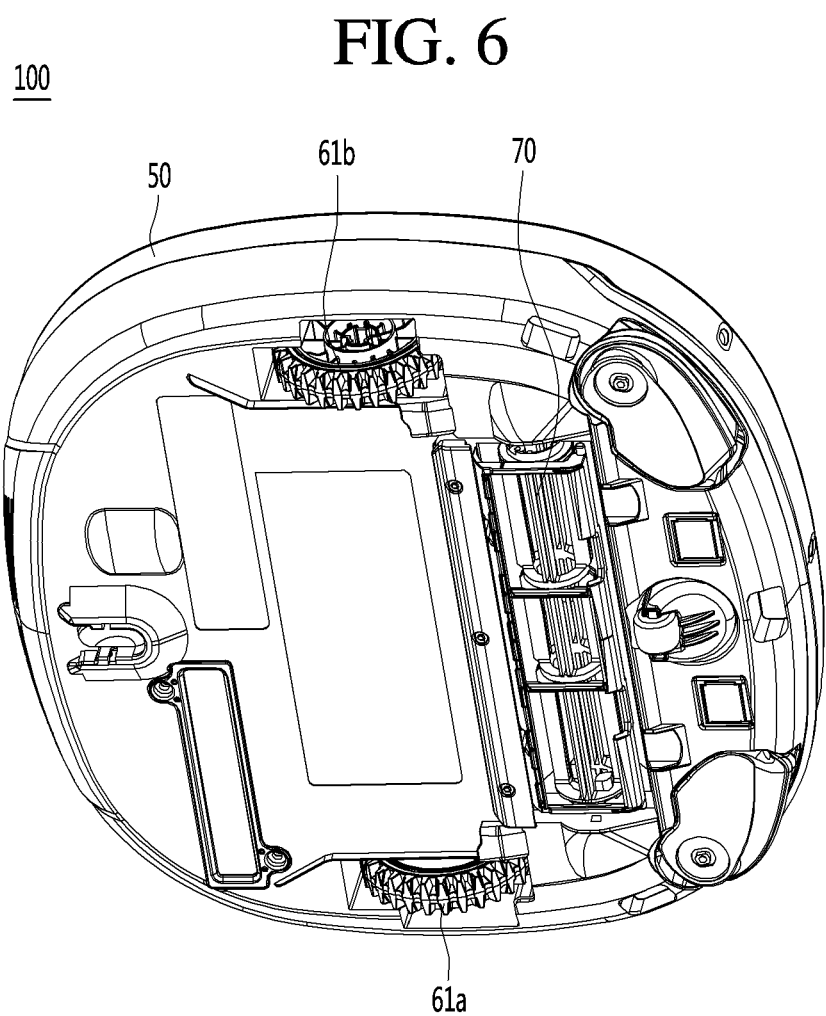
FIG. 6 a bottom view of an AI device according to an embodiment of the present invention.

FIG. 6 is a bottom view of the AI device 100 according to an embodiment of the present invention.

Referring to FIG. 6, the AI device 100 may further include a cleaner body 50, a left wheel 61*a*, a right wheel 61*b*, and a suction unit 70 in addition to the components of FIG. 4.

The left wheel 61*a* and the right wheel 61*b* may allow the cleaner body 50 to travel.

The left wheel driving unit 161 may drive the left wheel 61*a* and the right wheel driving unit 162 may drive the right wheel 61*b*.

As the left wheel 61*a* and the right wheel 61*b* are rotated by the driving unit 160, the AI robot 100 may suction foreign matters such as dust and garbage through the suction unit 70.

The suction unit 70 is provided in the cleaner body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not illustrated) may include a damp cloth (not illustrated) and a motor (not illustrated) to rotate the damp cloth in contact with the floor and to move the damp cloth along a set pattern.

The AI device 100 may wipe the floor with the mopping unit (not illustrated).

Figure 7:
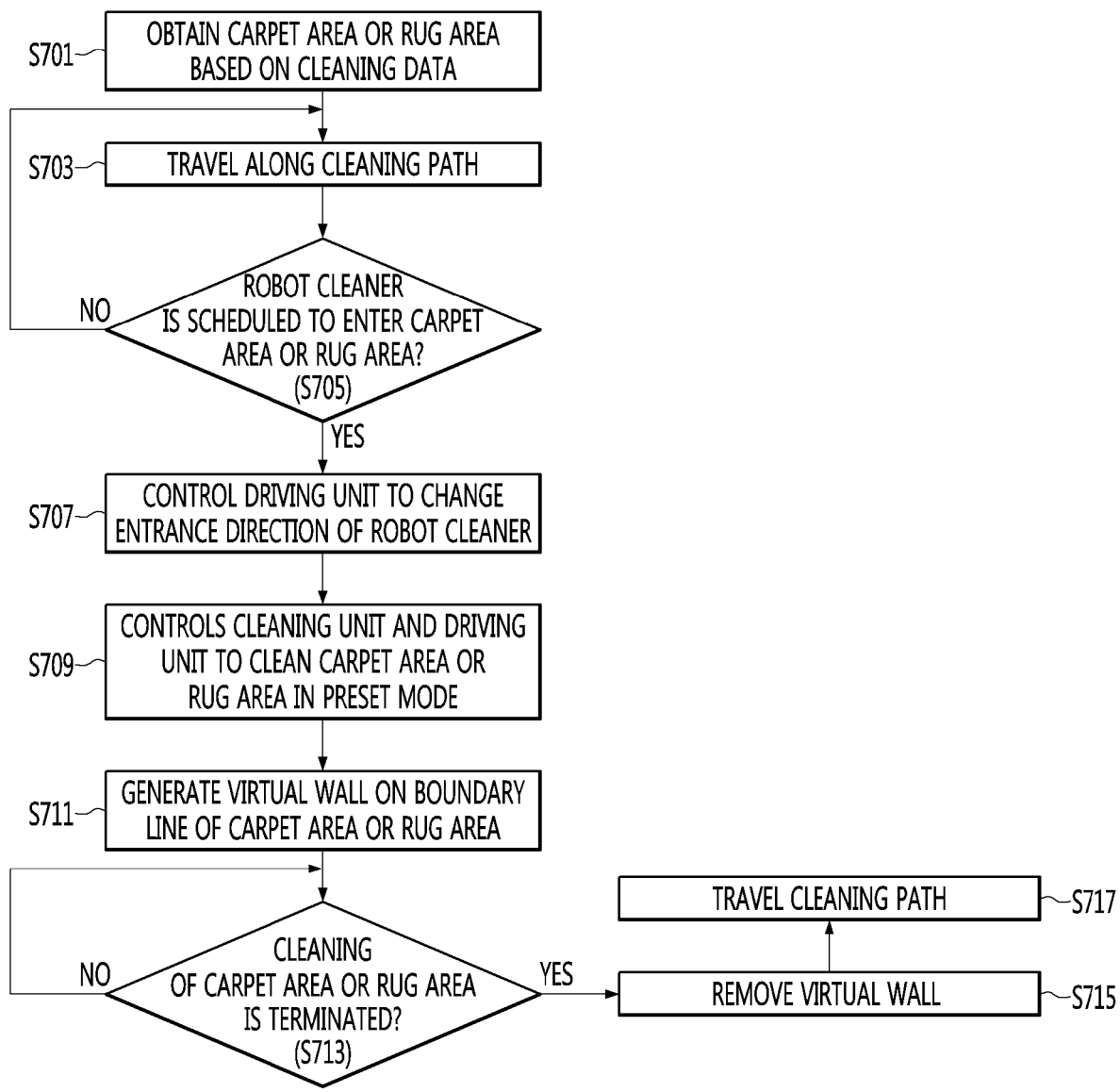
FIG. 7 is a view illustrating one example of an artificial intelligence system according to an embodiment of the present disclosure.

FIG. 7 is a flowchart illustrating an operating method of an AI device to clean in consideration of a floor state according to an embodiment of the present invention.

For the convenience of explanation, the AI 100 is named a robot cleaner.

In addition, hereinafter, a carpet and a rug are distinguished therebetween only based on a size. The carpet may occupy the entire portion of a floor, and the rug may be spread only a part of the floor.

A processor 180 of the robot cleaner 100 obtains a carpet area or rug area based on cleaning data (S701).

The cleaning data includes information on a result obtained as the robot cleaner 100 cleans based on a cleaning map.

The cleaning data may be stored in a memory 170.

The cleaning data may be data received from an AI server 200.

The cleaning data may include an intensity of a first current applied to the left wheel motor provided in the left wheel driving unit 161 or an intensity of a second current applied to the right wheel motor provided in the right wheel driving unit 162. The intensity of the current may be measured by at least one current sensor (not illustrated) provided in the robot cleaner 100.

For example, when at least one of the intensity of the first current or the intensity of the second current is equal to or greater than a preset intensity while the robot cleaner 100 is travelling, the processor 180 may determine an area at a relevant position as the carpet area, in which a carpet is positioned, or a rug area in which a rug is positioned. This is because, when the robot cleaner 100 travels on the carpet or the rug, a traveling resistance is strong, so a current supplied to the motor is increased as compared to a normal floor.

The processor 180 may store a position in which the intensity of the current measured on the motor is detected as being equal to or greater than a preset intensity, and may detect the carpet area or rug area based on the stored position.

As another example, when the at least one of the intensity of the first current or the intensity of the second current is equal to or greater than a preset intensity, in the state that the robot cleaner 100 does not operate in a smart turbo mode, the processor 180 may determine an area at a relevant position as the carpet area or rug area.

This is because the smart turbo mode is one type of an intensively cleaning mode, and the intensity of the current supplied to the motor may be increased in the smart turbo mode for intensive cleaning.

Meanwhile, the processor 180 may store, in the memory 170, a carpet area position data corresponding to the detected carpet area and a rug area position data corresponding to the detected rug area.

The processor 180 controls the cleaning unit 190 and the driving unit 160 such that the robot cleaner 100 travels along a preset cleaning path (S703).

The processor 180 may control the cleaning unit 190 and the driving unit 160 such that the robot cleaner 100 travels along a preset cleaning path on the cleaning map previously stored in the memory 170.

The processor 180 determines whether the robot cleaner 100 is scheduled to enter the carpet area or rug area (S705).

The carpet area position data corresponding to the carpet area or the rug area position data corresponding to the rug area may be previously stored in the memory 170.

The processor 180 may determine whether the robot cleaner 100 is scheduled to enter the carpet area or rug area, based on the carpet area position data or the rug area position data, while the robot cleaner 100 is traveling along the cleaning path.

The processor 180 may determine that the robot cleaner 100 is scheduled to enter the carpet area or rug area, when the robot cleaner 100 is positioned at a predetermined position from the carpet area or rug area.

When it is determined that the robot cleaner 100 is scheduled to enter the carpet area or rug area, the processor 180 controls the driving unit 160 to change the entrance direction of the robot cleaner 100 (S707).

According to an embodiment, when the robot cleaner 100 is scheduled to enter the carpet area or rug area, the processor 180 may change the entrance direction of the robot cleaner 100 such that the robot cleaner 100 enters in a diagonal direction from a boundary line of the carpet area or the rug area.

This is necessary to prevent the driving unit 160 from failing to smoothly perform the operation of the driving unit 160 as the carpet or the rug is pushed when the robot cleaner 100 enters the carpet area or rug area.

The details thereof will be described with reference to following drawings.

Figure 8:
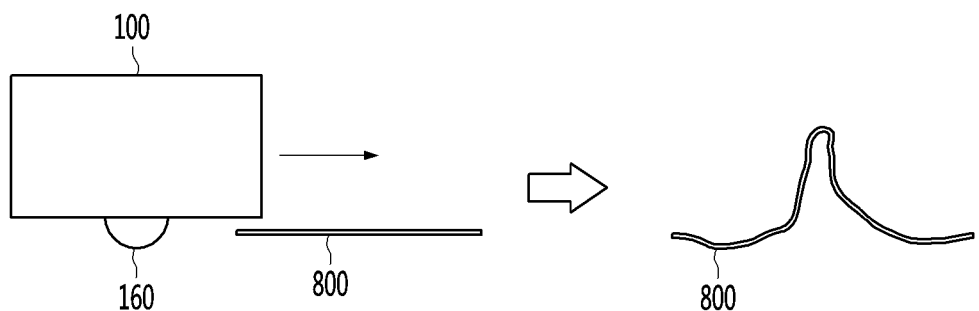
FIG. 8 is a view illustrating a problem occurring when the robot cleaner cleans a rug.

FIG. 8 is a view illustrating a problem occurring when the robot cleaner cleans a rug.

The robot cleaner 100 cleans a rug 800 while traveling. When the robot cleaner 100 enters the rug 800, the rug 800 may be pushed due to the friction between the driving unit 160 and the rug.

When the rug 800 is pushed, it may be difficult for the robot cleaner 100 to clean the rug 800, and the robot cleaner 100 may deviate from the cleaning path by the rug 800.

Figure 9:
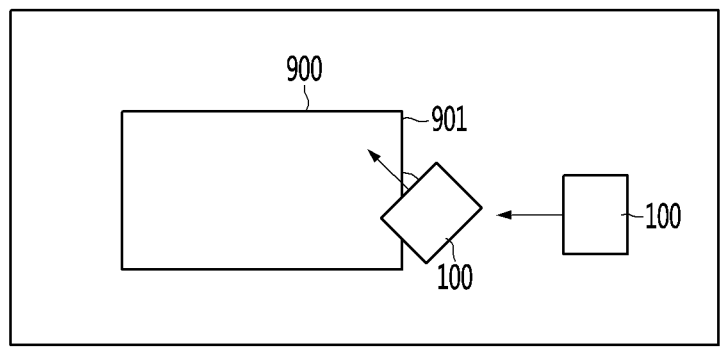
FIG. 9 is a view an example of changing a traveling direction when the robot cleaner enter a rug area in which a rug is positioned according to an embodiment of the present disclosure.

FIG. 9 is a view an example of changing a traveling direction when the robot cleaner enter a rug area in which a rug is positioned, according to an embodiment of the present disclosure.

Referring to FIG. 9, the robot cleaner 100 may detect a rug area 900 in which a rug is positioned while traveling along the cleaning path.

When the robot cleaner 100 detects the rug area 900, the robot cleaner 100 may control the driving unit 160 such that the robot cleaner 100 travels in a diagonal direction from a boundary line 901 of the rug area.

In detail, the robot cleaner 100 may change the traveling direction of the robot cleaner 100 to form a predetermined angle with respect to the boundary line 901 of the rug area 900.

The predetermined angle may be 45 degrees which is provided for the illustrative purpose.

The reason that the robot cleaner 100 enters the rug area 900 while forming the predetermined angle is because the probability of pushing the rug may be increased due to the rotation of the left wheel and the right wheel of the robot cleaner 100 when the left wheel and the right wheel of the robot cleaner 100 simultaneously make a friction with the rug.

In other words, if the robot cleaner 100 enters in the diagonal direction when entering the boundary line 901 of the rug area 900, the left wheel and the right wheel of the robot cleaner 100 sequentially make a friction with the rug instead of simultaneously making the friction, so the force of pushing the rug is weakened. Accordingly, the probability of pushing the rug may be reduced.

According to an embodiment of the present disclosure, when the robot cleaner 100 enters the rug area 900, as the traveling direction of the robot cleaner 100 is changed, the robot cleaner 100 may easily enter the rug area 900 to sufficiently clean the rug area 900.

Hereinafter, the description will be made again with reference to FIG. 7.

The processor 180 controls the cleaning unit 190 and the driving unit 160 to clean the carpet area or rug area in a preset mode (S709).

The preset mode may be an intensively cleaning mode. The intensively cleaning mode is a mode for more intensively cleaning by more increasing revolution per minute (RPM) or more increasing a cleaning time as compared to the case that the typical floor is cleaned.

The processor 180 may change the operating mode to the intensively cleaning mode in entering the carpet area or rug area. This is because dust may be more piled up on the carpet or the rug than the typical floor.

The processor 180 generates a virtual wall on a boundary line of the carpet area or rug area when cleaning the carpet area or rug area (S711).

According to an embodiment, the virtual wall may be a wall used to allow the robot cleaner 100 to more thoroughly clean the carpet area or rug area.

The size of the virtual wall may be larger than the size of the rug area. The processor 180 may reflect the virtual wall on the cleaning map, when the robot cleaner 100 is positioned in the carpet area or rug area.

The details thereof will be described with reference to FIG. 10.

Figure 10:
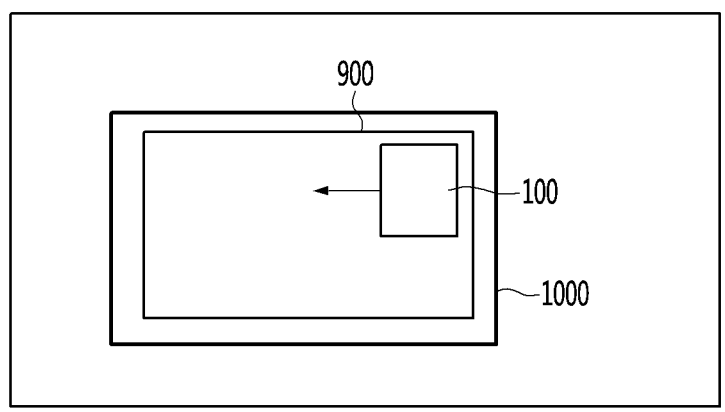
FIG. 10 is a view illustrating a procedure of generating a virtual wall when the robot cleaner enters the rug area according to an embodiment of the present disclosure.

FIG. 10 is a view illustrating a procedure of generating a virtual wall when the robot cleaner enters the rug area, according to an embodiment of the present disclosure.

Referring to FIG. 10, when the entire portion of the robot cleaner 100 enters the rug area 900, the robot cleaner 100 may generate a virtual wall 1000 larger than the rug area 900.

The robot cleaner 100 may generate the virtual wall 1000 to confine itself in the rug area 900 for a predetermined time.

The virtual wall 1000 is not viewed by the eyes of a human being, and viewed only by the robot cleaner 100.

The robot cleaner 100 does not deviate from the rug area 1000 for a predetermined time due to the virtual wall 1000.

In other words, the robot cleaner 100 may more intensively clean the rug area 900 due to the virtual wall 1000.

Meanwhile, the robot cleaner 100 may recognize the virtual wall 1000 through image recognition. The robot cleaner 100 may insert the virtual wall 1000 into an image captured by the camera 121, and may recognize the virtual wall 1000 as a real wall.

Hereinafter, the description will be made again with reference to FIG. 7.

The processor 180 determines whether the cleaning of the carpet area or rug area is terminated (S713).

The processor 180 may determine the cleaning as being terminated when cleaning is performed on the carpet area or rug area for a predetermined time.

As another example, the processor 180 may determine the cleaning as being terminated when the robot cleaner 100 has travelled throughout the entire potion of the carpet area or rug area.

The processor 180 removes the virtual wall when the cleaning of the carpet area or rug area is terminated (S715).

In an embodiment, the processor 180 may remove the virtual wall to clean another area when the cleaning of the carpet area or rug area is terminated.

This is necessary to prevent the robot cleaner 100 from failing to move to another area by the virtual wall 1000 after the cleaning of the rug area 900 is terminated.

Figure 11:
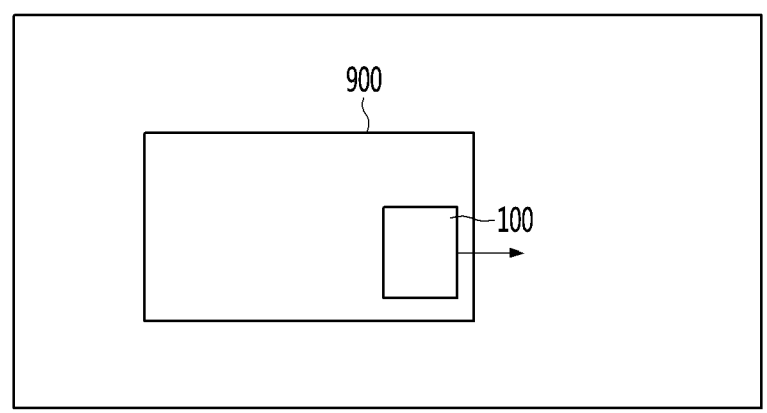
FIG. 11 is a view illustrating an example of removing the virtual wall when the cleaning of the rug area is terminated, according to an embodiment of the present disclosure.

FIG. 11 is a view illustrating an example of removing the virtual wall when the cleaning of the rug area is terminated, according to an embodiment of the present disclosure.

Referring to FIG. 11, the robot cleaner 100 may remove the virtual wall 1000 illustrated in FIG. 10 when the cleaning of the rug area 900 is terminated. As the virtual wall 1000 is removed, the robot cleaner 100 may deviate from the rug area 900 after the cleaning of the rug area 900 is terminated.

Hereinafter, the description will be made again with reference to FIG. 7.

Thereafter, the processor 180 may control the driving unit 160 and the cleaning unit 190 such that the robot cleaner 100 travels along the cleaning path (S717).

Meanwhile, the processor 180 may generate a new virtual wall after the robot cleaner 100 deviates from the rug area. The new virtual wall is a virtual wall used to prevent the rug area 90 from being repeatedly cleaned.

The details thereof will be described with reference to FIG. 12.

Figure 12:
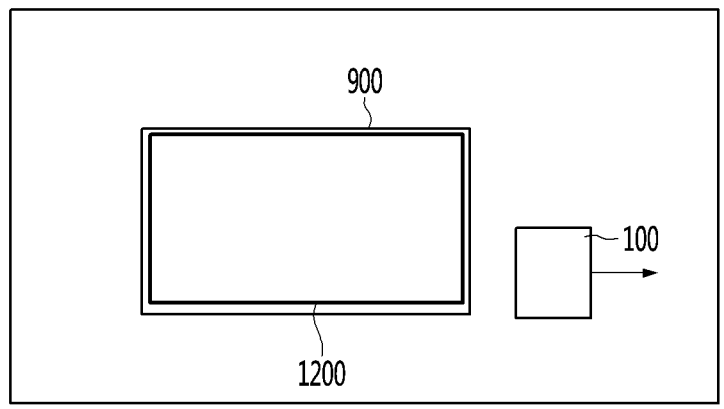
FIG. 12 is a view illustrating a procedure of generating a new virtual wall after the robot cleaner deviates from the rug area according to an embodiment of the present disclosure.

FIG. 12 is a view illustrating a procedure of generating the new virtual wall after the robot cleaner deviates from the rug area, according to an embodiment of the present disclosure.

Referring to FIG. 12, the robot cleaner 100 is travelling along the cleaning path after deviating from the rug area 900.

When the robot cleaner 100 deviates from the rug area 900, the processor 180 may generate a new virtual wall 1200 smaller than the size of the rug area 900.

The processor 180 may perform image processing of inserting the new virtual wall 1200 into an image captured by the camera 121.

The robot cleaner 100 may not access the rug area 900, which has been already cleaned, because the new virtual wall 1200 is present.

Accordingly, the rug area, which has been already cleaned, may be prevented from being repeatedly cleaned.

Figure 13:
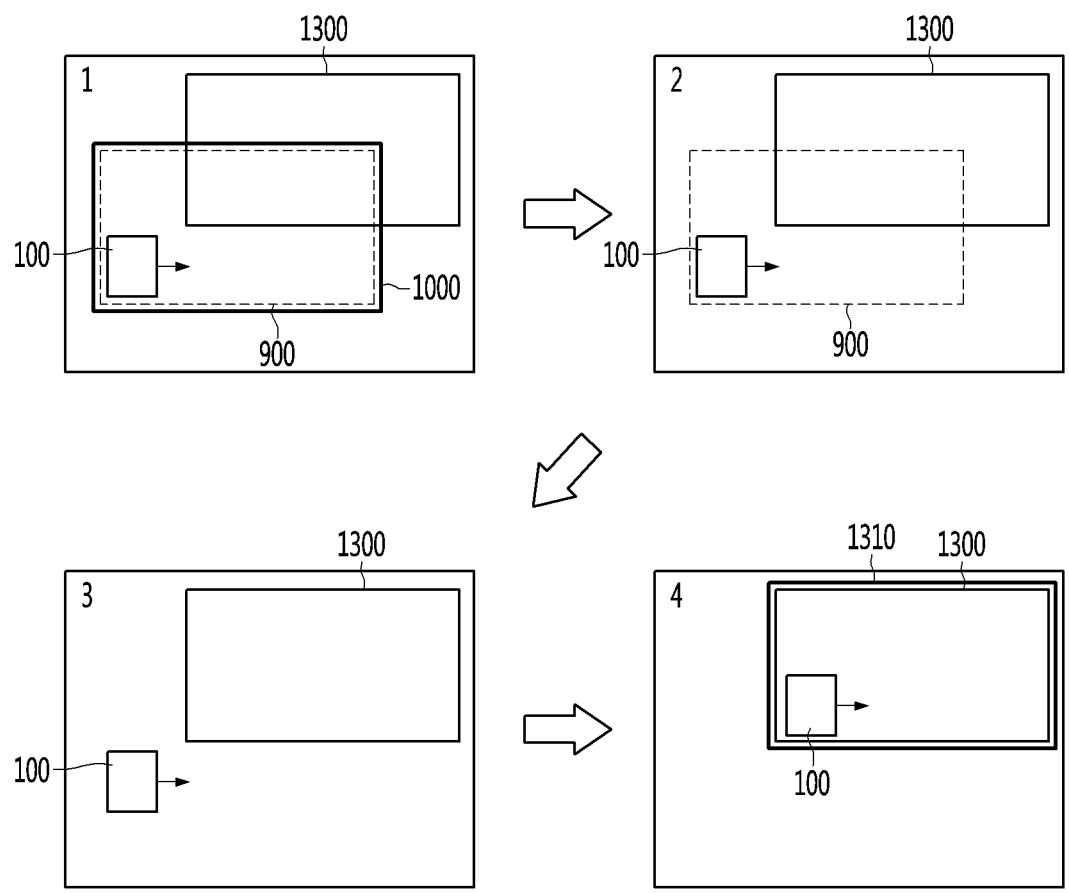
FIG. 13 is a view illustrating the operation of the robot cleaner when the position of the carpet area or rug area is changed according to an embodiment of the present disclosure.

FIG. 13 is a view illustrating the operation of the robot cleaner when the position of the carpet area or rug area is changed according to an embodiment of the present disclosure.

FIG. 13 illustrates the existing rug area 900 and a new rug area 1300.

The robot cleaner 100 may generate a virtual wall 1000 based on the position of the existing rug area 900.

The robot cleaner 100 may determine whether the position of the rug is changed, by using the intensity of a current supplied to a motor.

The robot cleaner 100 may determine that the position of the rug is changed, when the measured intensity of the current of the motor is less than a preset intensity, while the robot cleaner 100 is cleaning within the existing rug area 900.

As another example, the robot cleaner 100 may receive a signal indicating that the position of the rug is changed, from the AI server 200 through the communication unit 110. Simultaneously, the robot cleaner 100 may receive information on the position of the new rug area 1300 corresponding to the changed rug, from the AI server 200.

The robot cleaner 100 may remove the virtual wall 1000 when it is determined that the position of the rug is changed.

The robot cleaner 100 may sense the new rug area 1300 when it is determined that the position of the rug is changed. The robot cleaner 100 may determine the relevant area as the new rug area 1300 when the measured intensity of the current of the motor is equal to or greater than a preset intensity.

In addition, when it is determined that the position of the rug is changed, the robot cleaner 100 may delete information on the existing rug area 900 from the memory 170 and may sense the new rug area 1300.

In addition, the robot cleaner 100 may control the driving unit 160 such that the robot cleaner 100 enters in a diagonal direction from a boundary line of the new rug area 1300 when entering the new rug area 1300.

The robot cleaner 100 may generate, based on the new rug area 1300, a new virtual wall 1310 larger than the size of the new rug area 1300, when the new rug area 1300 is sensed.

The robot cleaner 100 may generate the new virtual wall 1310, when sensing the new rug area 1300 and being positioned within the new rug area 1300.

As described above, according to an embodiment of the present disclosure, the robot cleaner 100 may smoothly clean a new rug area by sensing the position of the rug, even if the position of the rug is changed.

Figure 14:
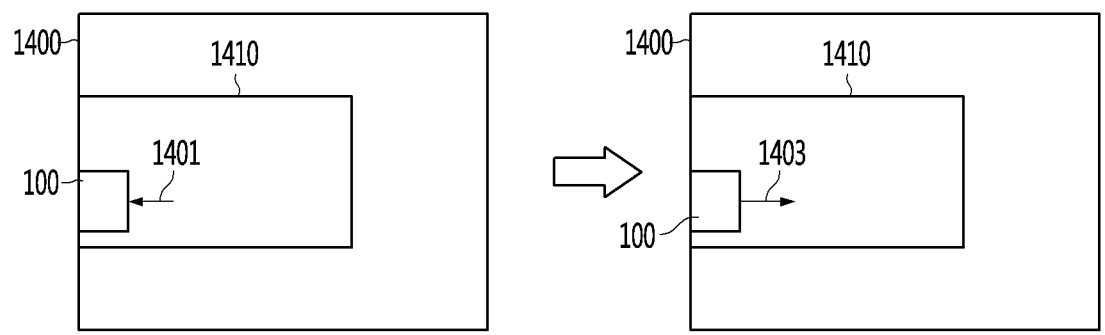
FIG. 14 is a view illustrating a method that the robot cleaner copes with the case that the robot cleaner is in close contact with a wall on a carpet or a rug according to an embodiment of the present disclosure.

FIG. 14 is a view illustrating a method that the robot cleaner copes with the case that the robot cleaner makes close contact with a wall on a carpet or a rug according to an embodiment of the present disclosure.

Referring to FIG. 14, a rug area 1410 may be positioned in close contact with a real wall 1400.

The robot cleaner 100 is in close contact with the real wall 1400 to clean the rug area 1410. In this case, as the robot cleaner 100 travels in a forward direction 1401, the rug may be pushed due to the rotation of the left wheel and the right wheel. In other words, although the robot cleaner 100 is fixed to the real wall 1400, the rug may be pushed due to the idle rotation of the left wheel and the right wheel.

To prevent this, when sensing that the robot cleaner 100 is in the close contact with the real wall 1410 while cleaning the rug area 1410, the robot cleaner 100 may control the driving unit 160 to change the traveling direction to a rearward direction 1403.

As another example, when sensing that the robot cleaner 100 is in the close contact with the real wall 1410 while cleaning the rug area 1400, the robot cleaner 100 may control the driving unit 160 to stop the rotation of the left wheel and the right wheel.

The robot cleaner 100 may sense the close contact with the real wall 1400 based on an image captured by the camera 121, or may determine that the robot cleaner 100 is in close contact with the wall, due to the idle rotation of the left wheel and the right wheel.

As described above, according to an embodiment of the present disclosure, the robot cleaner 100 may prevent the carpet or the rug from being pushed by stopping the rotation of the wheel or changing the traveling direction, when the robot cleaner 100 is in close contact with the wall on the carpet or the rug.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device.

What is claimed is:

1. A robot cleaner for cleaning in consideration of a floor state through artificial intelligence, the robot cleaner comprising:
   a camera;
   a communication interface configured to communicate with a server;
   a cleaning unit including a suction unit and a mopping unit;
   a driving motor to drive the robot cleaner, wherein the driving motor includes a left wheel motor to drive a left wheel and a right wheel motor to drive a right wheel; and
   a processor configured to:
   obtain a specific area representing a carpet area or a rug area based on cleaning data;
   control the driving motor to determine an entrance direction of the robot cleaner when the robot cleaner enters the specific area;
   generate a first virtual wall surrounding an area larger than the specific area when the robot cleaner enters the specific area;
   remove the first virtual wall when the robot cleaner terminates the cleaning of the specific area; and
   generate a second virtual wall surrounding at most an area smaller than the specific area when the robot cleaner deviates from the specific area, after removing the first virtual wall,
   wherein the second virtual wall is generated to prevent the area smaller than the specific area from being repeatedly cleaned.

2. The robot cleaner of claim 1, wherein the processor is further configured to:
   control the driving motor such that the robot cleaner enters in a diagonal direction from a boundary line of the carpet area or the rug area, when entering the carpet area or the rug area.

3. The robot cleaner of claim 2, wherein the processor is further configured to:
   control the driving motor such that the robot cleaner enters while forming a predetermined angle with respect to a boundary line of the carpet area or the rug area, when entering the carpet area or the rug area.

4. The robot cleaner of claim 1, wherein the processor is further configured to:
   control the cleaning unit and the driving motor such that an operating mode of the robot cleaner is a preset mode, when the robot cleaner enters the carpet area or the rug area.

5. The robot cleaner of claim 1, wherein the first virtual wall is generated to intensively clean the carpet area or the rug area.

6. The robot cleaner of claim 1, wherein the cleaning data includes information on a result obtained as the robot cleaner cleans based on a cleaning map.

7. An operating method of a robot cleaner for cleaning in consideration of a floor state through artificial intelligence, the operating method comprising:
   obtaining cleaning data;
   obtaining a specific area representing a carpet area or a rug area based on the obtained cleaning data;
   controlling a driving motor of the robot cleaner to determine an entrance direction of the robot cleaner when the robot cleaner enters the specific area, wherein the driving motor includes a left wheel motor to drive a left wheel and a right wheel motor to drive a right wheel;
   generating a first virtual wall surrounding an area larger than the specific area when the robot cleaner enters the specific area;
   removing the first virtual wall when the robot cleaner terminates the cleaning of the specific area; and
   generating a second virtual wall surrounding at most an area smaller than the specific area when the robot cleaner deviates from the specific area, after removing the first virtual wall,
   wherein the second virtual wall is generated to prevent the area smaller than the specific area from being repeatedly cleaned.

8. The operating method of claim 7, wherein the controlling of the driving motor includes:
   controlling the driving motor such that the robot cleaner enters in a diagonal direction from a boundary line of the carpet area or the rug area, when entering the carpet area or the rug area.

9. The operating method of claim 8, wherein the controlling of the driving motor includes:
   controlling the driving motor such that the robot cleaner enters while forming a predetermined angle with respect to a boundary line of the carpet area or the rug area, when entering the carpet area or the rug area.

10. The operating method of claim 7, further comprising:
    controlling a cleaning unit and the driving motor such that an operating mode of the robot cleaner is a preset mode, when the robot cleaner enters the carpet area or the rug area.

11. The operating method of claim 7, wherein the first virtual wall is generated to intensively clean the carpet area or the rug area.

12. The operating method of claim 7, wherein the cleaning data includes information on a result obtained as the robot cleaner cleans based on a cleaning map.

\* \* \* \* \*